(12) United States Patent
Prokupek

(10) Patent No.: US 9,279,225 B1
(45) Date of Patent: Mar. 8, 2016

(54) SURFACE WATER OUTLET DEVICE

(71) Applicant: Dennis A. Prokupek, Statesville, NC (US)

(72) Inventor: Dennis A. Prokupek, Statesville, NC (US)

(*) Notice: Subject to any disclaimer, the term of this patent is extended or adjusted under 35 U.S.C. 154(b) by 0 days.

(21) Appl. No.: 14/533,609

(22) Filed: Nov. 5, 2014

(51) Int. Cl.
| | |
|---|---|
| *E02B 15/00* | (2006.01) |
| *B01D 35/05* | (2006.01) |
| *E02B 11/00* | (2006.01) |
| *E03F 5/10* | (2006.01) |
| *C02F 1/00* | (2006.01) |
| *E02B 15/10* | (2006.01) |
| *B01D 21/24* | (2006.01) |
| *C02F 103/06* | (2006.01) |

(52) U.S. Cl.
CPC .......... *E02B 11/005* (2013.01); *B01D 21/2444* (2013.01); *B01D 35/05* (2013.01); *C02F 1/00* (2013.01); *E02B 15/106* (2013.01); *E03F 5/103* (2013.01); *E03F 5/105* (2013.01); *C02F 2103/06* (2013.01)

(58) Field of Classification Search
CPC ......... E02B 5/085; E02B 8/023; E02B 8/026; E02B 15/106; E03F 5/103; E03F 5/105; E03F 5/106; E03F 5/107; B01D 21/0003; B01D 21/0024; B01D 21/2444; B01D 35/05
USPC ............ 210/122, 170.05, 170.09, 242.1, 461, 210/498, 540, 747.6, 747.9, 776; 405/40, 405/96, 97, 127
See application file for complete search history.

(56) References Cited

U.S. PATENT DOCUMENTS

| | | | | | |
|---|---|---|---|---|---|
| 3,109,812 | A | * | 11/1963 | McAulay et al. | 210/242.1 |
| 4,179,379 | A | * | 12/1979 | Mitchell | 210/242.1 |
| 4,892,666 | A | * | 1/1990 | Paulson | 210/540 |
| 4,973,405 | A | * | 11/1990 | Kozey | 210/242.1 |
| 5,451,330 | A | * | 9/1995 | Garrett | 210/776 |
| 5,601,705 | A | * | 2/1997 | Glasgow | 210/122 |
| 5,820,751 | A | * | 10/1998 | Faircloth, Jr. | 210/242.1 |
| 5,849,188 | A | * | 12/1998 | Voll et al. | 210/498 |
| 7,790,023 | B1 | * | 9/2010 | Mills | 210/242.1 |
| 7,794,589 | B2 | * | 9/2010 | Kozey | 210/242.1 |
| 2008/0000527 | A1 | * | 1/2008 | Ranstead et al. | 137/2 |

* cited by examiner

*Primary Examiner* — Christopher Upton
(74) *Attorney, Agent, or Firm* — Shumaker, Loop & Kendrick, LLP

(57) ABSTRACT

A surface water outlet device for allowing water removal from a sediment pond while controlling sediment removal that includes a float formed of interconnected lengths of pipe sealed against water intrusion and a drain pipe attached to the float and having a plurality of openings to allow water to drain into the drain pipe. A swivel is positioned intermediate the float and the drain pipe and adapted to allow the float to rise and fall with the water level in the sediment pond and to allow the drain pipe to pivot relative to the float as the floats rises and falls with the water level. An annular slide pipe is positioned over the drain pipe and is moveable along the length of the drain pipe to cover a varying length of the slots to correspondingly vary the rate at which water flows into the drain pipe through the slots.

10 Claims, 4 Drawing Sheets

SURFACE WATER OUTLET DEVICE

TECHNICAL FIELD AND BACKGROUND OF THE INVENTION

This invention relates to a surface water outlet device of the type used to allow water to be drained from sediment ponds or basins, in order to prevent overflow and flooding of surrounding areas. These devices are sometimes referred to as "skimmers." Sediment ponds are frequently used to prevent or minimize water runoff from agricultural land and construction sites where rain or other water sources may erode and wash large amounts of sediment onto roads, yards and other areas if not controlled. Sediment has a particularly detrimental effect on drinking water supplies and can substantially reduce the volume of water that can be stored in rivers and impoundments used to supply municipal water systems.

Sediment ponds are constructed according to regulations, and typically include temporary soil embankments raised above the surrounding land forming the impoundment, a filter fabric bottom liner, a series of vertical baffle and an inflow structure such as one or more pipes that allows surface and drainage water to flow into the pond. An emergency spillway somewhat below the level of the top of the embankment allows water to flow out through the spillway instead of overtopping and eroding the embankment.

Regulations now require sediment ponds to be equipped with a flotation device that drains water from the pond at a controlled rate when the water reaches a specified level. The device is intended to drain water from the very top surface at a controlled rate, resulting in the clearest possible discharge, while the sediment remains on the bottom of the pond or basin.

The present invention solves several existing problems in the operation of prior art outlet devices by permitting a single device that can be field adjusted and used on a wide range of basin volumes by allowing variable discharge flow based on water depth that insures proper water retention times during rain events of any size.

SUMMARY OF THE INVENTION

It is therefore an object of the present invention to provide a surface water outlet device for use in sediment ponds and basins.

It is another object of the invention to provide a surface water outlet device that can be field adjusted.

It is another object of the invention to provide a surface water outlet device that drains water from a pond at a controlled rate when the water reaches a specified level.

It is another object of the invention to provide a surface water outlet device that is used on a wide range of basin volumes by allowing variable discharge flow based on water depth that ensures proper water retention times during rain events of any size.

These and other objects and advantages of the invention are achieved by providing a surface water outlet device for allowing water removal from a sediment pond while controlling sediment removal that includes a float comprised of interconnected lengths of pipe sealed against water intrusion, and a drain pipe attached to the float and having a plurality of openings to allow water to drain into the drain pipe. A swivel is positioned intermediate the float and the drain pipe and adapted to allow the float to rise and fall with the water level in the sediment pond and to allow the drain pipe to pivot relative to the float as the floats rises and falls with the water level. An annular slide pipe is positioned over the drain pipe and is moveable along the length of the drain pipe to cover a varying length of the slots to correspondingly vary the rate at which water flows into the drain pipe through the slots. A discharge pipe is provided for discharging water from the drain pipe.

According to another embodiment of the invention, a flexible pipe is attached to a downstream end of the discharge pipe.

According to another embodiment of the invention, the discharge pipe is rigid.

According to another embodiment of the invention, a filter screen is positioned over the drain pipe to prevent debris from clogging the slots.

According to another embodiment of the invention, the float is U-shaped and includes first and second parallel pipe sections and a connecting pipe section extending between and interconnected with the first and second parallel pipe sections.

According to another embodiment of the invention, the swivel is positioned in a pipe section extending between the first and second legs and swivels about an axis that is parallel to the connecting pipe section.

According to another embodiment of the invention, the filter screen comprises a cylindrical tube positioned concentrically over the slotted drain pipe and having a diameter larger than the diameter of the slotted drain pipe.

According to another embodiment of the invention, the openings in the drain pipe comprise slots.

According to another embodiment of the invention, a surface water outlet device is provided for allowing water removal from a sediment pond while controlling sediment removal, and includes a float comprised of first and second parallel pipes sealed on respective first ends and interconnected with each other at respective second ends by a connecting pipe section extending perpendicularly between the first and second parallel pipes to form a U-shape, and a drain pipe having a plurality of slots extending along a length of the drain pipe.

According to another embodiment of the invention, a swivel pipe is attached between the connecting pipe section of the float and the drain pipe, and extends between the first and second parallel pipes and is adapted to allow the float to rise and fall with the water level in the sediment pond to allow the drain pipe to pivot relative to the float as the floats rises and falls with the water level. An annular slide pipe is positioned over the drain pipe and is moveable along a length of the drain pipe to cover a varying length of the slots to correspondingly vary the rate at which water flows into the drain pipe through the slots.

According to another embodiment of the invention, the float is U-shaped and includes first and second spaced-apart parallel pipe sections and a connecting pipe section extending between and interconnected with the first and second parallel pipe sections.

According to another embodiment of the invention, the swivel is positioned in a pipe section extending between the first and second legs.

According to another embodiment of the invention, the filter screen includes a cylindrical tube having a diameter larger than the diameter of the slotted drain pipe that is positioned concentrically over the slotted drain pipe.

According to another embodiment of the invention, the parallel pipes and the connecting pipe section are PVC and are connected by elbow pipe sections that are PVC.

According to another embodiment of the invention, a series of visual indications are provided on the drain pipe in the area of the slots to permit the slide pipe to be moved to a position on the drain pipe correlated to a rate of water flow into the drain pipe through the slots.

According to another embodiment of the invention, a surface water outlet device is provided for allowing water removal from a sediment pond while controlling sediment removal, and includes a float that includes first and second parallel pipes sealed on respective first ends and interconnected with each other at respective second ends by a connecting pipe section extending perpendicularly between the first and second parallel pipes to form a U-shape. A drain pipe is provided having a plurality of elongate slots extending along a portion of its length parallel to a longitudinal axis of the drain pipe. A swivel pipe is attached between the connecting pipe section of the float and the drain pipe, and extends between the first and second parallel pipes and is adapted to allow the float to rise and fall with the water level in the sediment pond and to allow the drain pipe to pivot relative to the float as the float rises and falls with the water level. An annular slide pipe is positioned over the drain pipe and is moveable along a length of the drain pipe to cover a varying length of the slots to correspondingly vary the rate at which water flows into the drain pipe through the slots. A series of visual indications on the drain pipe in the area of the slots is provided to permit the slide pipe to be moved to a position on the drain pipe correlated to a rate of water flow into the drain pipe through the slots. A filter screen in the form of a cylindrical tube is provided, having a diameter larger than the diameter of the slotted drain pipe and positioned concentrically over the slotted drain pipe. A discharge pipe is provided for being connected to the drain pipe for discharging water from the drain pipe, and a flexible outlet pipe is connected to the discharge pipe for conveying water to a sediment pond outlet.

BRIEF DESCRIPTION OF THE DRAWING FIGURES

The present invention is best understood when the following detailed description of the invention is read with reference to the accompanying drawings, in which.

DETAILED DESCRIPTION OF THE PREFERRED EMBODIMENT

Figure 1:
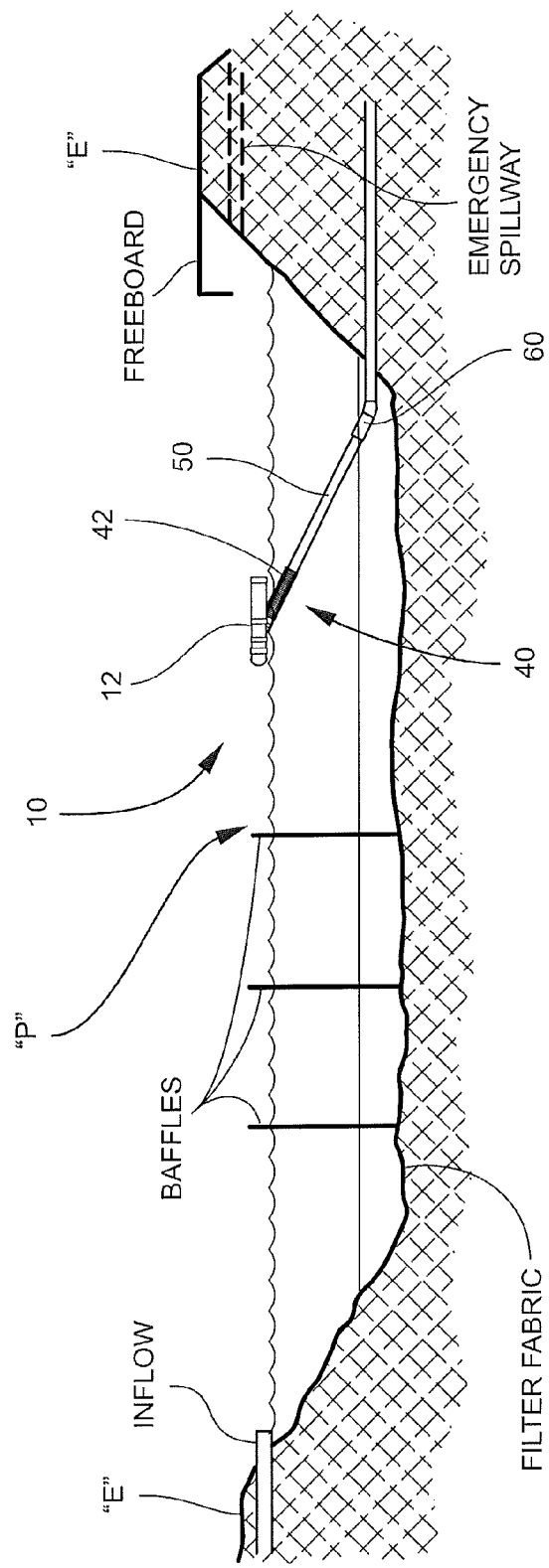
FIG. 1 is a schematic side elevation of a typical sediment pond utilizing a surface water outlet device according to a preferred embodiment of the invention.

Referring now to the drawings, a typical sediment pond arrangement is shown in FIG. 1. The pond includes embankments scaled to hold a specified amount of water, and inflow structure, such as one or more pipes in a dewatering zone, a bottom covered with filter fabric and vertical baffles to reduce the rate of water flow across the pond and thereby allow sediment to naturally settle to the bottom as it moves across the pond. An outlet is provided near the bottom of the pond as well as an emergency spillway near the top of the embankment.

A surface water outlet device 10 according to a preferred embodiment of the invention is shown positioned in the pond "P" at a level just below full pond. As described below, the device 10 includes a float 12 that remains on the surface and moves up and down with the water level, a variable discharge mechanism 40, and transfer pipe 50 and a flexible discharge tube 60.

Figure 2:
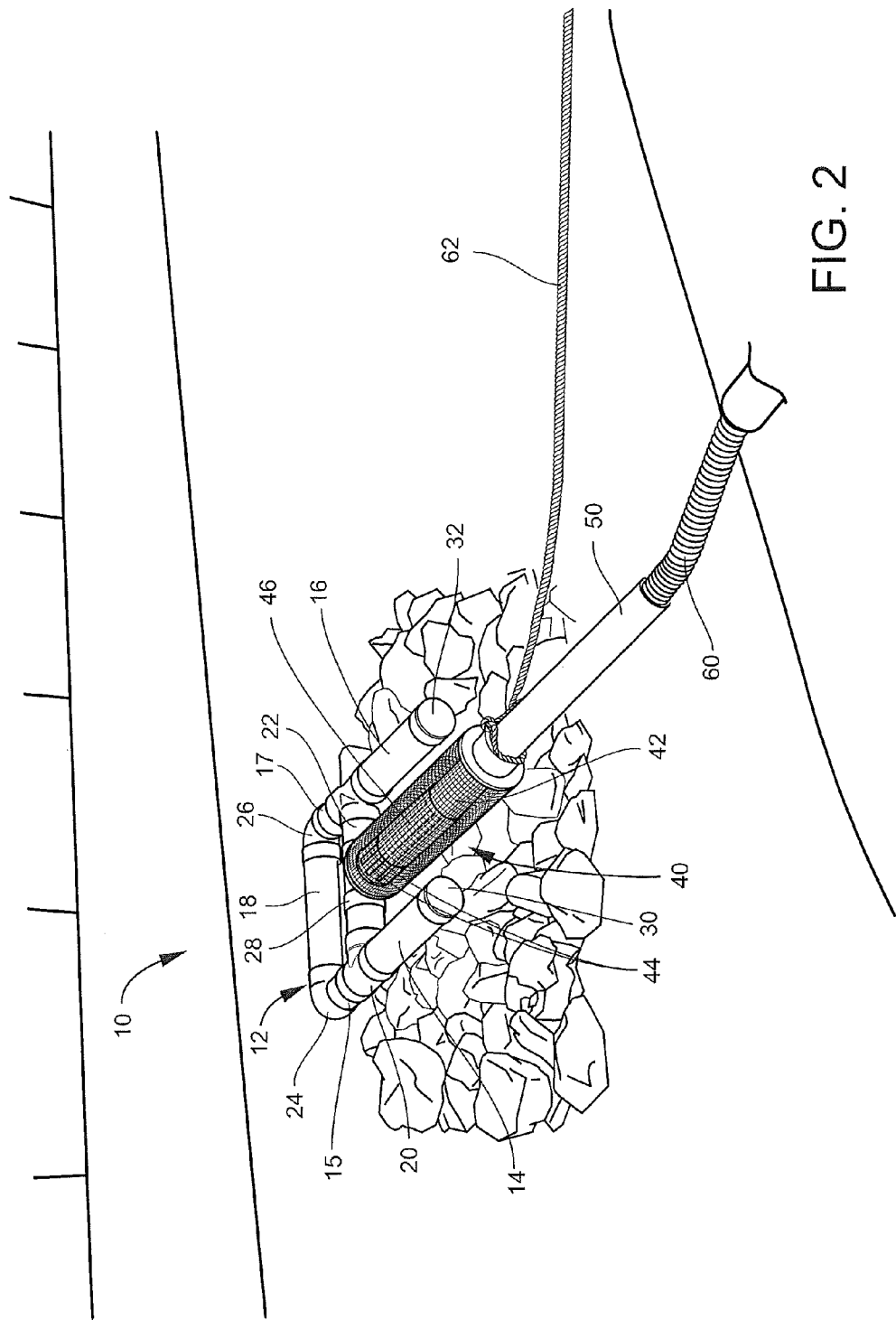
FIG. 2 is a perspective view of the surface water outlet device in place in a sediment pond.

Referring to FIGS. 2-5, the float 12 is constructed of PVC pipe and is formed into a U-shaped structure of straight pipe sections 14, 15, 16, 17 and 18 interconnected by tee-sections 20 and 22 and elbows 24 and 26. End caps 30, 32 enclose the ends of pipe sections 14 and 16. A centrally-positioned swivel tee 28 is interconnected to the pipe sections 14, 15, 16 and 17 and is allowed to pivot according to the water level. This permits the float 12 to remain level and floating on the surface as the water level varies. FIG. 1 shows the float 12 at a high water level with the discharge mechanism 40 and transfer pipe 50 extending at a relatively steep angle down to the outlet. In contrast, as shown in FIG. 2 the float 12, discharge mechanism 40 and transfer pipe 50 are aligned with each other when the water level is low and the float 12 is bottomed out in the rip-rap base.

The pipe sections 14, 15, 16 and 17, tee-sections 20, 22 and elbows 24, 26 are glued together and sealed against water intrusion. The variable discharge mechanism 40 is mounted to the swivel tee 28 and a drain pipe 42 provided with several longitudinally-extending slots 44 that extend along a major part of the length of the drain pipe 42. An annular slide pipe 46 is positioned on the drain pipe 42 and is movable along the length of the drain pipe 42 as desired to vary the rate of water flow through the drain pipe 42. As the slide pipe 46 is moved along the drain pipe 42 towards the swivel tee 28, water flow through the slots 44 is reduced, and as the slide pipe 46 is moved away from the swivel tee 28, the water flow through the slots 44 is allowed to increase. The slide pipe 46 is omitted for clarity in FIGS. 4 and 5.

The drain pipe 42 is provided with indicator marks at 1 inch intervals starting at the swivel tee 28. In accordance with the chart set out below, slide settings in inches of open slots provides a predictable discharge rate and retention rate in basins between 1000 ft$^3$ and 80,000 ft$^3$.

| (A) Basin ft$^3$ | (B) Slide setting in inches of open slots | (C) Average discharge ft$^3$/hr | (D) Average retention days |
|---|---|---|---|
| 1000 | 0.5 | 15 | 2.8 |
| 2000 | 1 | 30 | 2.8 |
| 3000 | 1.5 | 45 | 2.8 |
| 3000 | 1 | 30 | 4.2 |
| 4000 | 2 | 63 | 2.6 |
| 4000 | 1.5 | 45 | 3.7 |
| 5000 | 2 | 63 | 3.3 |
| 6000 | 3 | 95 | 2.6 |
| 8000 | 4 | 139 | 2.4 |
| 8000 | 3 | 95 | 3.5 |
| 10000 | 5 | 195 | 2.1 |
| 10000 | 4 | 139 | 3.0 |
| 15000 | 6 | 264 | 2.4 |
| 15000 | 5 | 195 | 3.2 |
| 20000 | 7 | 346 | 2.4 |
| 20000 | 6 | 264 | 3.2 |
| 25000 | 8 | 428 | 2.4 |
| 25000 | 7 | 346 | 3.0 |
| 30000 | 8 | 428 | 2.9 |
| 30000 | 7 | 346 | 3.6 |
| 35000 | 10 | 602 | 2.4 |
| 35000 | 8 | 428 | 3.4 |

-continued

| (A) Basin ft³ | (B) Slide setting in inches of open slots | (C) Average discharge ft³/hr | (D) Average retention days |
|---|---|---|---|
| 40000 | 10 | 602 | 2.8 |
| 40000 | 9 | 508 | 3.3 |
| 45000 | 11 | 686 | 2.7 |
| 45000 | 10 | 602 | 3.1 |
| 50000 | 11 | 686 | 3.0 |
| 55000 | 12 | 748 | 3.1 |
| 60000 | 12 | 748 | 3.3 |
| 65000 | 12 | 748 | 3.6 |
| 70000 | 12 | 748 | 3.9 |
| 80000 | 12 | 748 | 4.5 |

Figure 3:
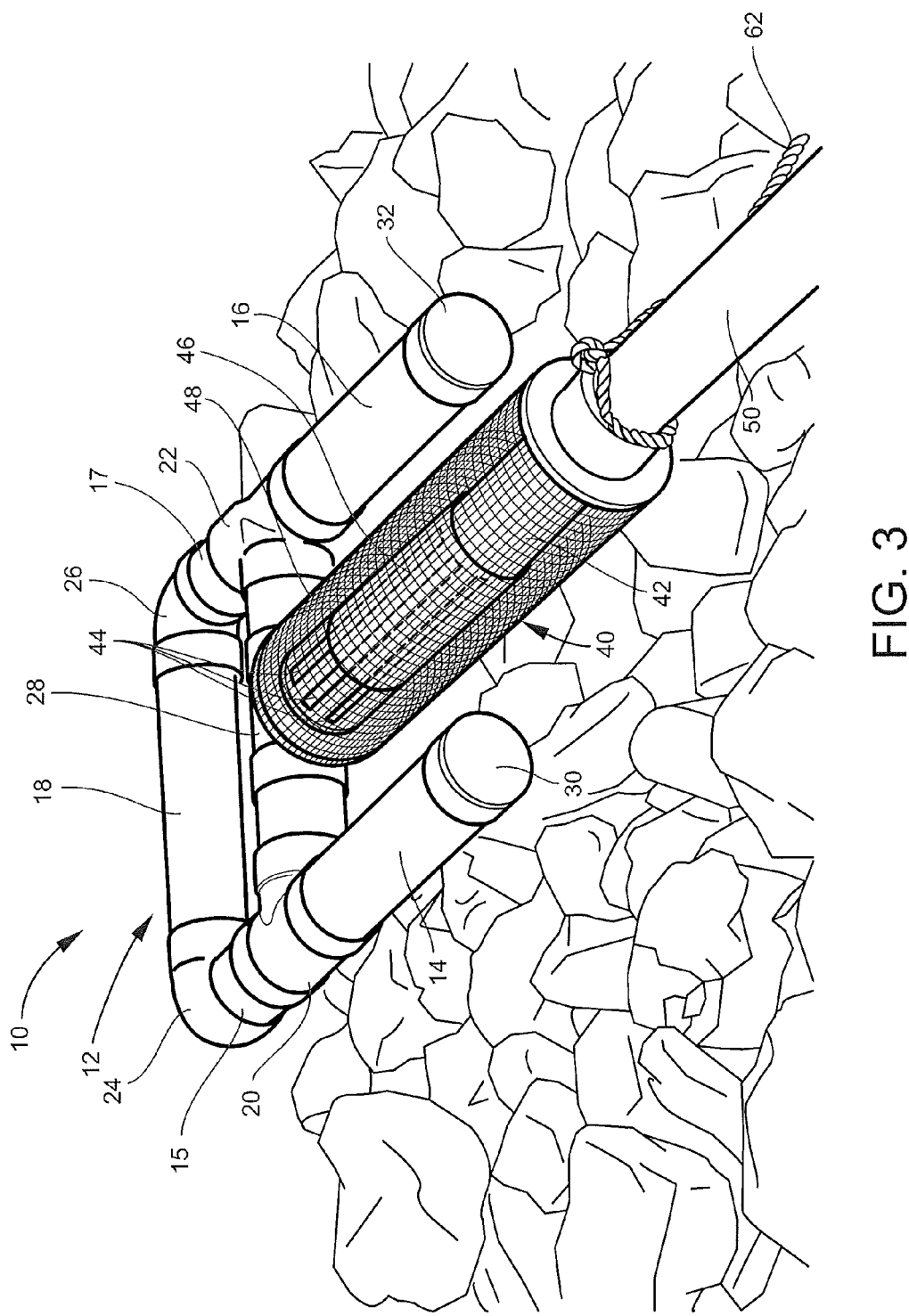
FIG. 3 is an enlarged fragmentary perspective view according to FIG. 2, showing the manner of adjustment of the device to regulate the water retention time in the pond.
Figure 4:
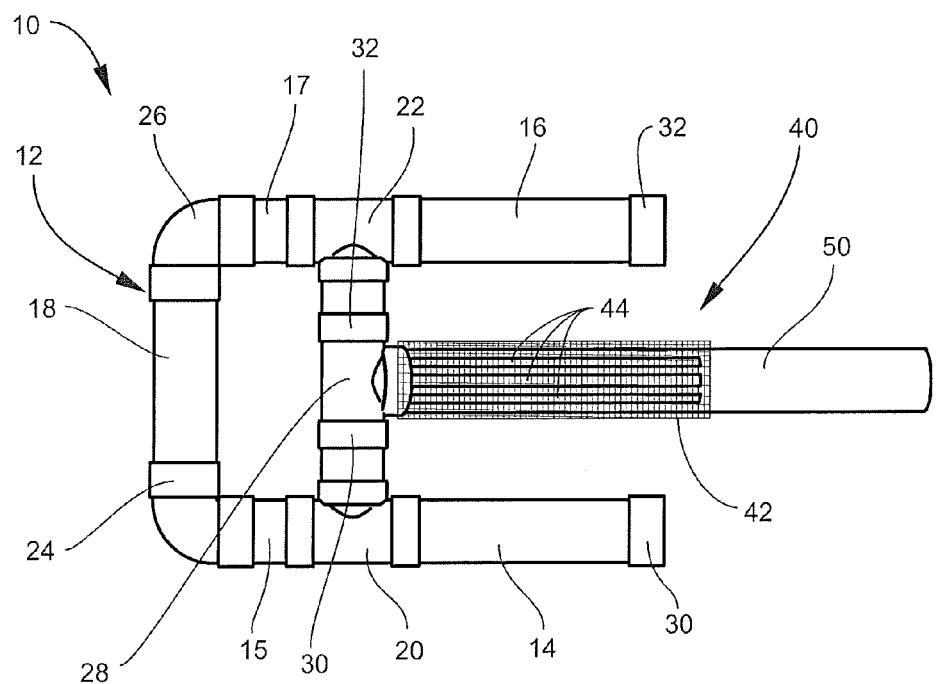
FIG. 4 is a top plan view of the surface water outlet device.
Figure 5:
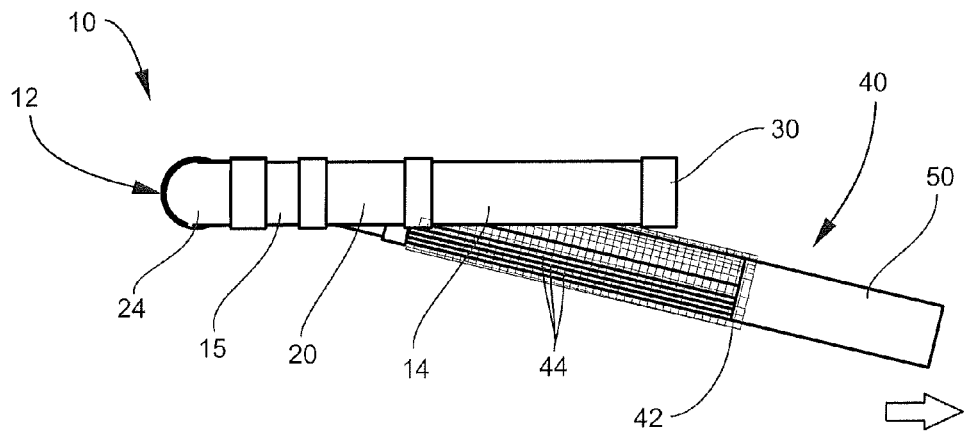
FIG. 5 is a side elevation of the surface water outlet device.

An annular screen 48 is positioned over the drain pipe 42 and slide pipe 46 to prevent clogging by debris. As best shown in FIG. 3, the screen 48 is formed as a cylinder having a diameter substantially larger than the drain pipe in order to provide space between the screen 48 and the slots 44. Thus, any debris accumulated on the surface of the screen 38 does not also block the slots 44.

Water from the drain pipe 42 passes through a straight transfer pipe 50 and into a flexible pipe 60 for passage through the embankment "E". A cord 62 is attached to the float 12 and allows the float 12 to be retrieved and brought to the embankment "E" when necessary. As shown in FIGS. 1-3, the float 12 is preferably positioned on a bed of rip-rap at a position level with the outlet. According to one preferred embodiment of the invention, three inch PVC pipe is used for the float 12, transfer pipe 50 and flexible pipe 60. One size device will handle multiple basins by adjusting the slide. Retention times can be up to 7 days.

A surface water outlet device according to the invention has been described with reference to specific embodiments and examples. Various details of the invention may be changed without departing from the scope of the invention. Furthermore, the foregoing description of the preferred embodiments and best mode for practicing the invention are provided for the purpose of illustration only and not for the purpose of limitation, the invention being defined by the claims.

What is claimed is:

1. A surface water outlet device for allowing water removal from a sediment pond while controlling sediment removal, comprising:
   (a) a float comprised of interconnected lengths of pipe sealed against water intrusion;
   (b) a drain pipe attached to the float and having slots to allow water to drain into the drain pipe;
   (c) a swivel positioned intermediate the float and the drain pipe and adapted to allow the float to rise and fall with the water level in the sediment pond and to allow the drain pipe to pivot relative to the float as the floats rises and falls with the water level;
   (d) an annular slide pipe positioned over the drain pipe and moveable along the length of the drain pipe to cover a varying length of the slots to correspondingly vary the rate at which water flows into the drain pipe through the slots; and
   (e) a discharge pipe for discharging water from the drain pipe, wherein:
   a filter screen is positioned over the drain pipe to prevent debris from clogging the slots.

2. A surface water outlet device according to claim 1, and including a flexible pipe attached to a downstream end of the discharge pipe.

3. A surface water outlet device according to claim 2, wherein the discharge pipe is rigid.

4. A surface water outlet device according to claim 1, wherein the float is U-shaped and includes first and second parallel pipe sections and a connecting pipe section extending between and interconnected with the first and second parallel pipe sections.

5. A surface water outlet device according to claim 1, wherein the filter screen comprises a cylindrical tube positioned concentrically over the slots and having a diameter larger than a diameter of the drain pipe.

6. A surface water outlet device for allowing water removal from a sediment pond while controlling sediment removal, comprising:
   (a) a float comprised of first and second parallel pipes sealed on respective first ends and interconnected with each other at respective second ends by a connecting pipe section extending perpendicularly between the first and second parallel pipes to form a U-shape;
   (b) a drain pipe having a plurality of slots extending along a length of the drain pipe;
   (c) a swivel pipe attached between the connecting pipe section of the float and the drain pipe, extending between the first and second parallel pipes and adapted to allow the float to rise and fall with the water level in the sediment pond, to allow the drain pipe to pivot relative to the float as the floats rises and falls with the water level; and
   (d) an annular slide pipe positioned over the drain pipe and moveable along a length of the drain pipe to cover a varying length of the slots to correspondingly vary the rate at which water flows into the drain pipe through the slots, wherein:
   a filter screen is positioned over the slotted drain pipe to prevent debris from clogging the slots.

7. A surface water outlet device according to claim 6, wherein the filter screen comprises a cylindrical tube having a diameter larger than the diameter of the slotted drain pipe that is positioned concentrically over the slotted drain pipe.

8. A surface water outlet device according to claim 6, wherein the parallel pipes and the connecting pipe section are PVC and are connected by elbow pipe sections that are PVC.

9. A surface water outlet device according to claim 6, including a series of visual indications on the drain pipe in the area of the slots to permit the slide pipe to be moved to a position on the drain pipe correlated to a rate of water flow into the drain pipe through the slots.

10. A surface water outlet device for allowing water removal from a sediment pond while controlling sediment removal, comprising:
   (a) a float comprised of first and second parallel pipes sealed on respective first ends and interconnected with each other at respective second ends by a connecting pipe section extending perpendicularly between the first and second parallel pipes to form a U-shape;
   (b) a drain pipe having a plurality of elongate slots extending along a portion of its length parallel to a longitudinal axis of the drain pipe;
   (c) a swivel pipe attached between the connecting pipe section of the float and the drain pipe, extending between the first and second parallel pipes and adapted to allow the float to rise and fall with the water level in the sediment pond and to allow the drain pipe to pivot relative to the float as the float rises and falls with the water level;

(d) an annular slide pipe positioned over the drain pipe and moveable along a length of the drain pipe to cover a varying length of the slots to correspondingly vary the rate at which water flows into the drain pipe through the slots;

(e) a series of visual indications on the drain pipe in the area of the slots to permit the slide pipe to be moved to a position on the drain pipe correlated to a rate of water flow into the drain pipe through the slots;

(f) a filter screen comprising a cylindrical tube having a diameter larger than the diameter of the slotted drain pipe and positioned concentrically over the slotted drain pipe;

(g) a discharge pipe for being connected to the drain pipe for discharging water from the drain pipe; and (h) a flexible outlet pipe connected to the discharge pipe for conveying water to a sediment pond outlet.

\* \* \* \* \*